United States Patent [19]

Sibata

[11] Patent Number: 5,326,961
[45] Date of Patent: Jul. 5, 1994

[54] BAR CODE READER WITH COMPARISON OF BAR WIDTHS AND SIGNAL TRANSITIONS

[75] Inventor: Yosimitu Sibata, Okazaki, Japan

[73] Assignee: Nippondenso Co., Ltd., Kariya, Japan

[21] Appl. No.: 51,372

[22] Filed: Apr. 23, 1993

[30] Foreign Application Priority Data

Apr. 24, 1992 [JP] Japan .................................. 4-107047
Mar. 10, 1993 [JP] Japan .................................. 5-049037

[51] Int. Cl.⁵ .............................................. G06K 7/10
[52] U.S. Cl. ..................................... 235/463; 235/462
[58] Field of Search ......................... 235/462, 463, 437

[56] References Cited

U.S. PATENT DOCUMENTS

| | | | |
|---|---|---|---|
| 3,932,840 | 1/1976 | Hanchett | 235/463 |
| 4,239,151 | 12/1980 | Enser et al. | 235/437 |
| 4,323,772 | 4/1982 | Serge | 235/463 |
| 5,245,167 | 9/1993 | Takenaka | 235/462 |

FOREIGN PATENT DOCUMENTS 63-94383 4/1988 Japan .

Primary Examiner—Donald Hajec
Assistant Examiner—Jeffrey R. Filipek
Attorney, Agent, or Firm—Cushman, Darby & Cushman

[57] ABSTRACT

In a bar code reading device in which an image of a bar code is Converted into an information signal having transitions corresponding to bar data in the bar code, a first counter counts the numbers of pulses of a clock signal provided by a reference clock corresponding to the periods between transitions of the information signal. The pulse counts are stored in a first memory. A second counter counts the number of transitions in the information signal and stores the number of transitions in a second memory. Since the procedure carried out by the second counter can occur in a very short time, the number of bar data can correctly be counted even if the bar code has defective bar data formed by misprinting. Accordingly, an ALU is able to decide whether or not the bar code is recognized correctly through a comparison of the number of periods between transitions stored in the first memory and the number of transitions stored in the second memory. Thus, incorrect bar code reading operations can be prevented.

10 Claims, 6 Drawing Sheets

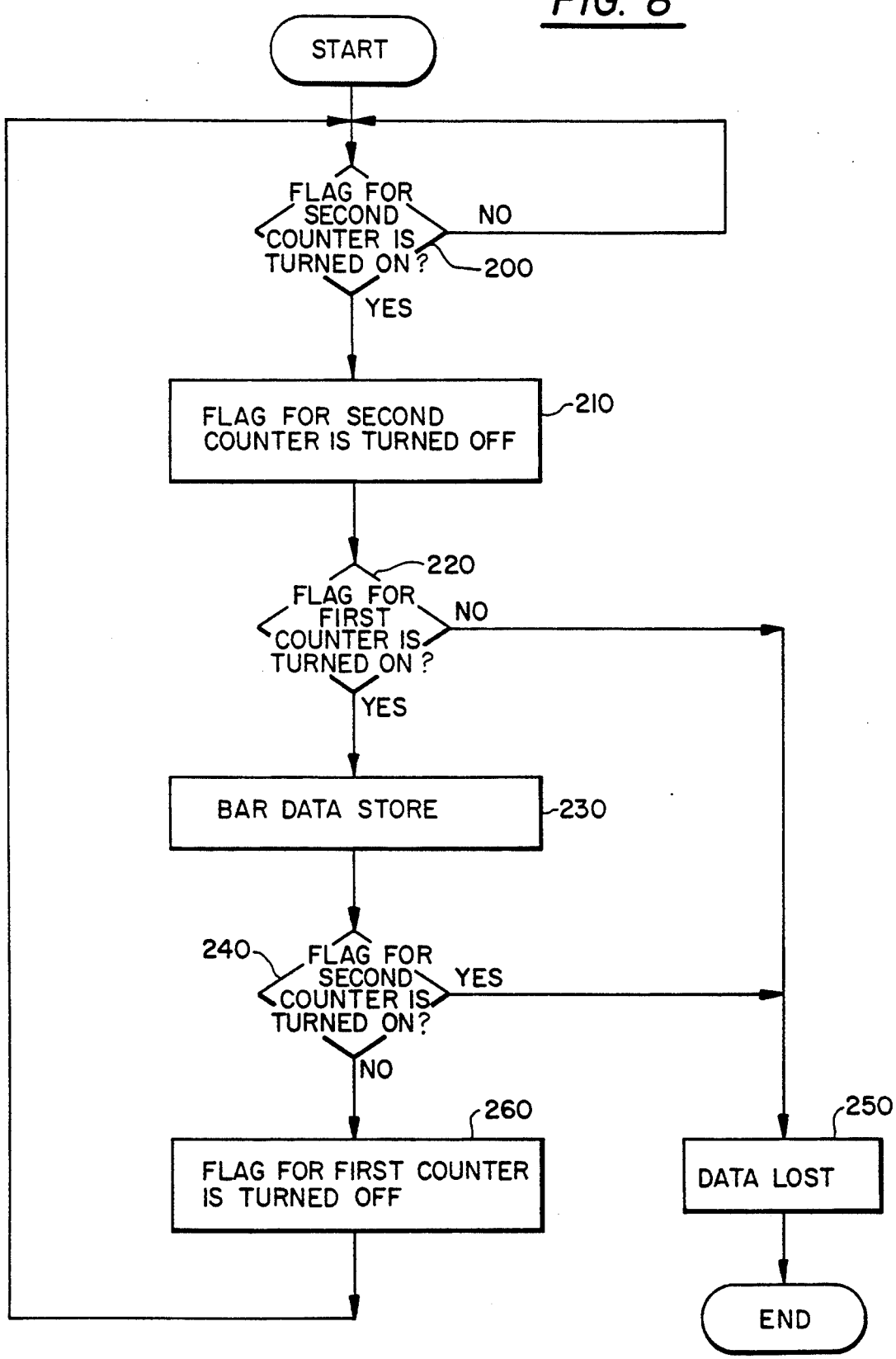

BAR CODE READER WITH COMPARISON OF BAR WIDTHS AND SIGNAL TRANSITIONS

BACKGROUND OF THE INVENTION

1. Field of the Invention

The present invention relates to a bar code reader for reading optical information contained in bar codes.

2. Description of the Prior Art

Bar codes consist of a series of adjacent stripes of various widths. A conventional arrangement for reading bar codes is shown in FIG. 9. An image sensor 30 converts an image of a bar code focused thereon into an information signal as shown in FIG. 3B by photoelectric conversion. Then a waveform shaping unit 32 shapes, e.g., amplifies and binarizes, the output signal of image sensor 30 to produce a binary signal as shown in FIG. 3C.

Then, a counter 33 counts the number of pulses of a clock signal generated by a reference clock 31 corresponding to each stripe of the bar code to determine a time period corresponding to the width of each stripe. The pulse count, and the corresponding levels, are stored in a memory 34.

When the counts for all of the stripes of the bar code have been stored, an arithmetic logic unit (hereinafter abbreviated "ALU") calculates the respective widths of the stripes from the pulse counts and determines information represented by the bar code on the basis of the combinations of the widths of the stripes and the corresponding levels.

Counter 33 employed in an existing bar code reader is designed specially for the bar code reader. A level L is assigned to the initial value of counter 33 and data: "Level: L, Pulse count: a" assigned to the first count is stored in memory 34 regardless of the actual level of the binary signal, changes in the level of the binary signal are detected and a combination of a level and a corresponding pulse count, for example, "Level: L1, Pulse count: a" "Level: , H1, Pulse count: b" and the like, are stored in memory 34 every time a level change is detected. The count is reset automatically and the level is changed automatically.

Counter 33, which is employed in the existing bar code reader, detects the change in the level of the binary signal instead of detecting the level of the analog information signal. In some cases, the levels corresponding to the pulse counts are the opposite of the actual levels of the stripes and spaces of the bar code. However, since the same inverted levels are used to interpret the entire bar code, the information represented by the bar code can be read by using such inverted levels.

However, the prior art bar code reader generates erroneous data if the bar code has a defective stripe A, as shown in FIG. 3A, formed by defective printing. Counter 33 requires a period of time after a level change to stop counting, store the results and reinitialize the counter. Therefore, when reading the defective stripe A shown in FIG. 3A, a level change indicated at X in the binary signal will occur while the number of pulses of the clock signal is counted and the data "Level: H4, Pulse count: c" of the defective portion is stored in the memory 34. Consequently, counter 33 is unable to detect the level change X. Consequently, a region B, the level of which must be HIGH, is recognized wrongly as a LOW region as shown in FIG. 3 D.

Thus, if a bar code has a stripe with a defective portion at one end thereof, such as the defective stripe A as shown in FIG. 3A, the high/low correspondence with the actual bar code on one side of the defect differs from that on the other side of the defect. Therefore, ALU 35 translates the bar code wrongly.

SUMMARY OF THE INVENTION

It is an object of the present invention to provide a bar code reader and bar code reading method capable of Correctly deciding whether a detected bar code is correct or not to prevent the wrong recognition of the bar code.

A bar code reader and reading method in accordance with the present invention detects a loss of data correctly by using a second counter and a comparing means and inhibits the data processing operation of a decoder to prevent the wrong recognition of the bar code when the comparing means detects a difference between the data collected and the output of the second counter.

BRIEF DESCRIPTION OF THE DRAWINGS

FIG. 8 is a flowchart of steps in which the ALU (arithmetic logic unit) of the embodiment of FIG. 7 works.

DETAILED DESCRIPTION OF THE PREFERRED EMBODIMENTS

The present invention will be described hereinafter with reference to the accompanying drawings as applied to a portable bar code reader for reading a bar code consisting of a plurality of bar data, namely, stripes and spaces between the stripes.

Figure 1:
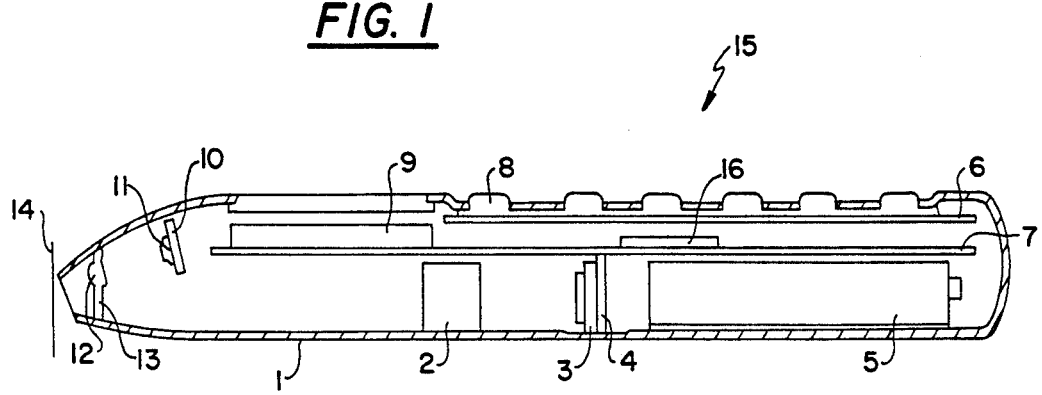
FIG. 1 is a sectional view of a bar code reader in a preferred embodiment of the present invention.

FIG. 1 shows a bar code reader 15 in a first embodiment according to the present invention. A case 1 is formed of an electrically insulating resin, and a keyboard 8 is formed on the front wall of case 1. The keys of keyboard 8 are operated to enter instructions into bar code reader 15. Either the instructions or operations of bar code reader are displayed on a display 9 to enable the operator to confirm visually the instructions and results of operation of bar code reader 15. When a start button, not shown, provided on the side wall of case 1 is depressed, bar code reader 15 starts reading a bar code 14.

A dust-protective plate 13, provided with a condensing lens 12, is disposed near the open end of case 1 to protect the interior of bar code reader 15 from dust. Condensing lens 12, having a convex surface on the open end of case 1, condenses light emitted by a light source 11 on bar code 14. Light source 11 comprises a red LED (light emitting diode) and illuminates a predetermined area uniformly. The light emitted by light source 11 travels through plate 13 and illuminates a bar code printed on a label. The surface of the label provided with bar code 14 reflects the incident light so that the reflected light, carrying an image of bar code 14, travels through plate 13 and is focused on an image sensor 3 by an image forming lens 2.

Image sensor 3 is a one-dimensional type comprising a plurality of photoelectric elements arranged in a line having a peak of spectral sensitivity within the spectrum of light emitted by light source 11. The incident light falling on image sensor 3 is converted by the photoelectric elements of image sensor 3 through photoelectric conversion into an electric information signal representing bar code 14.

A battery 5 is disposed under the keyboard 8 to supply power to electronic circuits contained in case 1. Power to the electronic circuits is controlled according to instructions entered by operating the keys of keyboard 8. The electronic circuits associated with keyboard 8, display 9 and light source 11 are formed on printed circuit boards 4, 6, 7 and 10, all connected to an ECU 16. ECU 16 receives signals generated by operating the keys of keyboard 8, controls the operation of light source 11 and display 9, and recognizes the information represented by bar code 14.

The operation of bar code reader 15 will be described hereinafter. When the start switch is depressed, ECU 16 provides power to light source 11. The light emitted by light source 11 is directed to the surface of the label provided with bar code 14 by condensing lens 12 and the light is reflected by the surface of the label. The reflected light travels through plate 13 into case 1 and is focused in an image of bar code 14 on image sensor 3 by image forming lens 2. Then, image sensor 3 converts the image of bar code 14 into a corresponding information signal. ECU 16 processes the information signal to recognize the information represented by bar code 14.

Figure 2:
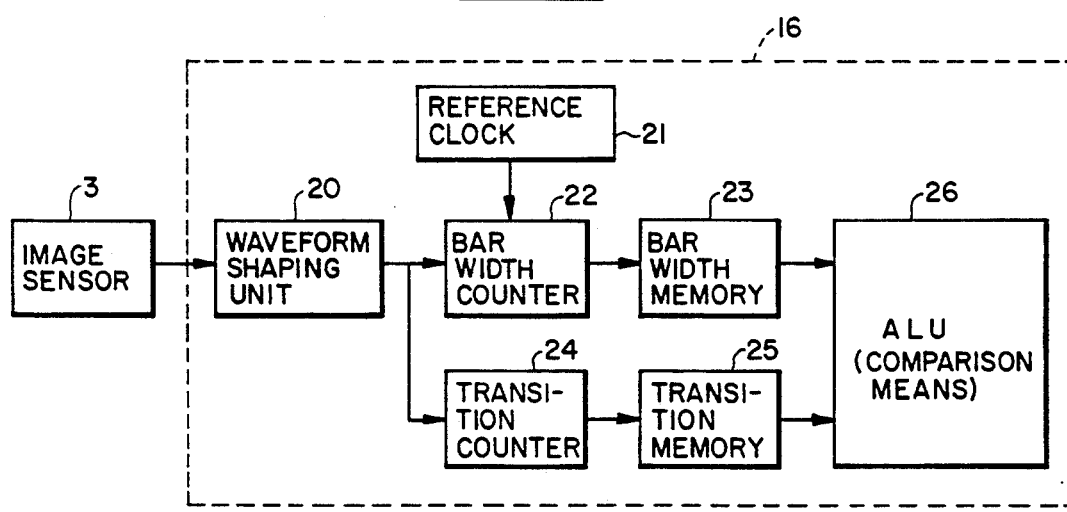
FIG. 2 is a block diagram of an electronic controls unit (ECU) included in the bar code reader of FIG. 1.

The circuit configuration of ECU 16 will be described hereinafter. Referring to FIG. 2, ECU 16 comprises a waveform shaping unit 20 for shaping, e.g., amplifying and binarizing, the information signal provided by image sensor 3. A clock 21 generates a clock signal. A bar width counter 22 counts the number of pulses of-the clock signal corresponding to the periods between transitions of the information signal. A bar width memory 23 stores the pulse counts representing the periods counted by first counter 22 and the levels of the information signal during those periods. A transition counter 24 counts the number of transitions of the output binary signal of waveform shaping unit 20. A transition memory 25 stores the number of transitions of the binary signal counted by transition counter 24. An ALU 26 recognizes the information represented by bar code 14 from the counts stored in bar width memory 23.

The operation of ECU 16 in response to an information signal corresponding to an image of bar code 14 will be described hereinafter.

Figure 3A:
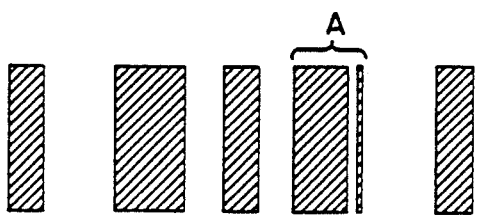
FIGS. 3A, 3B, 3C and 3D are diagrammatic views of waveforms of signals produced when reading a misprinted bar code.
Figure 3B:
Figure 3C:
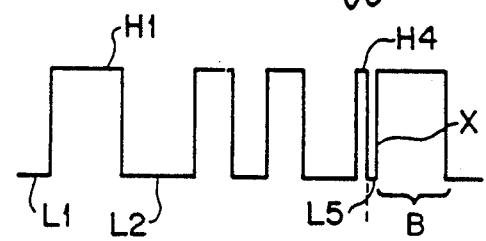
Figure 4:
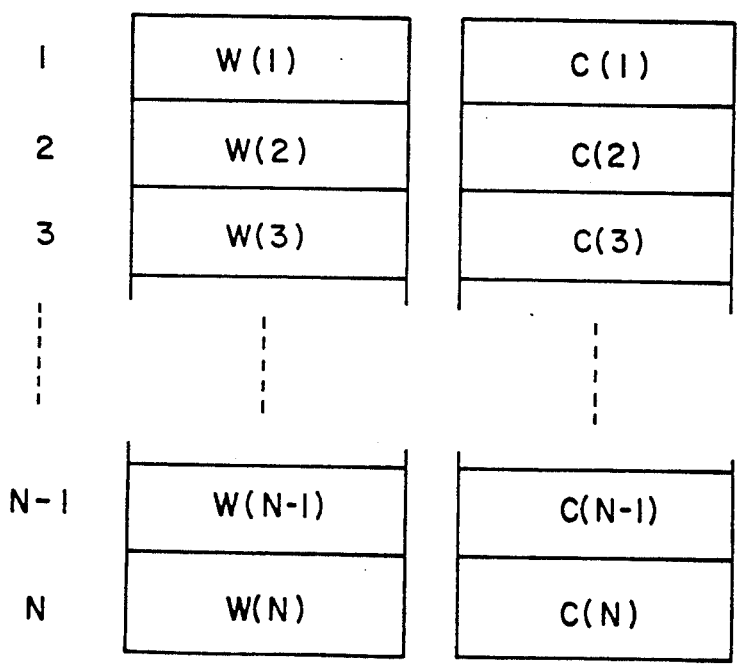
FIG. 4 is a diagram explaining the contents of first and second memories included in the bar code reader of FIG. 1.

Referring to FIG. 2, waveform shaping unit 20 amplifies and binarizes the waveform of the information signal provided by image sensor 3 to produce a binary signal as shown in FIG. 3C. Then, bar width counter 22 counts the pulses of the clock signal provided by reference clock 21 corresponding to the widths of the stripes and spaces of bar code 14 represented by the binary signal to determine time periods between transitions. The counts thus obtained and the levels of the signal during those periods are stored in bar width memory 23. Bar width counter 22 stores a combination of the count and the level in bar width memory 23 every time a transition is detected in the binary signal. Thus, data W(1), W(2), ... and W(N) are stored sequentially at an address 1, an address 2, ... and address N, respectively, in the order of storage as shown in FIG. 4. In the storage area of the bar width memory 23, counts corresponding to LOW levels are stored in odd addresses and counts corresponding to HIGH levels are stored in even addresses.

Transition counter 24 updates the contents of transition memory 25 every time the level of the binary signal provided by waveform shaping unit 20 changes to count the number of transitions of the binary signal. Thus, data C(1), C(2), ... and C(N) are stored at an address 1, an address 2, ... and an address N, respectively, in the order of storage as shown in FIG. 4. The number C(N) at the last address N is the total number N of transitions of the binary signal.

Figure 5:
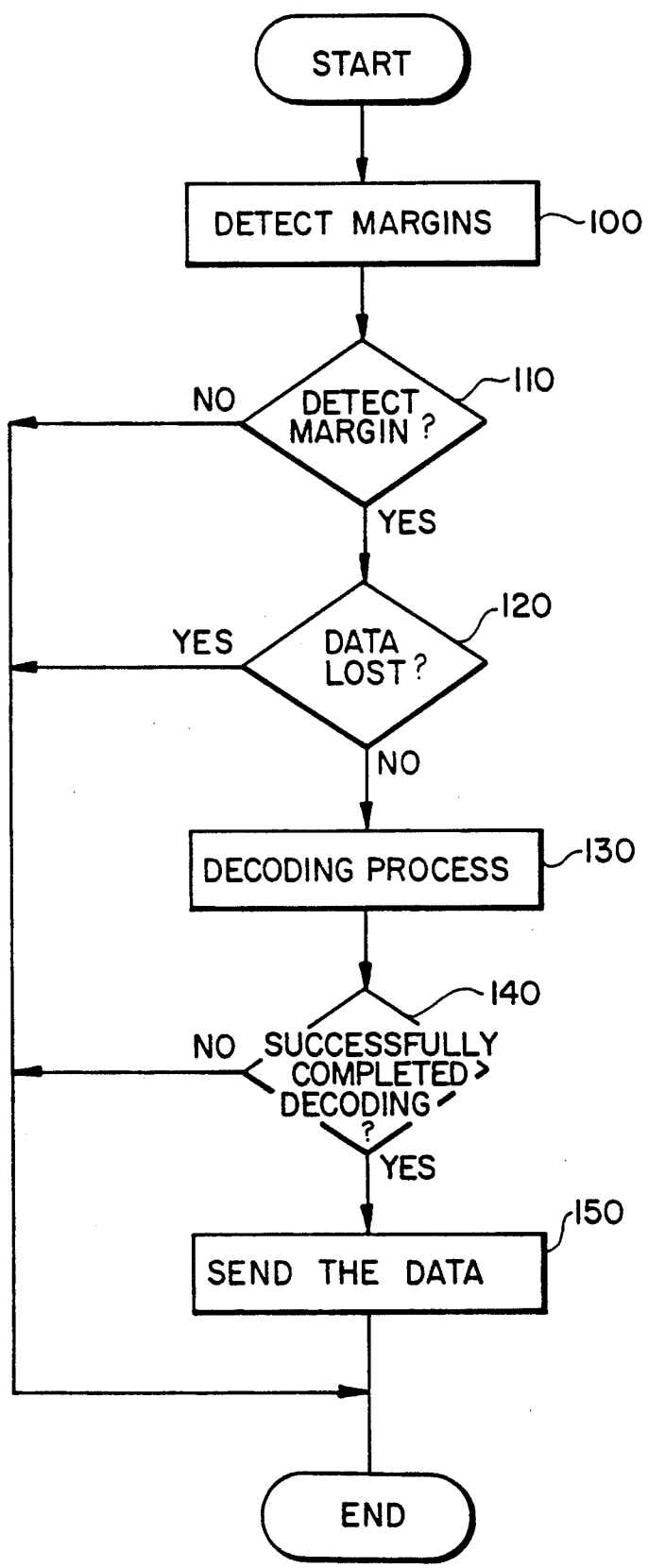
FIG. 5 is a flow chart of a procedure to be carried out by an arithmetic logic unit (ALU) included in the ECU.

After the pulse counts representing all the periods between transitions of the binary signal have been counted in bar width counter 22 and all of the transitions themselves have been counted in transition counter 24, a procedure shown in FIG. 5 is carried out to decide whether or not the information representing bar code 14 stored in bar width memory 23 is correct, and to decode the information.

The operation of ALU 26 will be described hereinafter with reference to FIG. 5.

At step 100, margins on the opposite sides of bar code 14 are detected from the counts stored in bar width memory 23. Since the width that image sensor 3 reads is far greater than the width of bar code 14, the margins can be detected by finding exceptionally large counts. In step 110, a query is made to see if the margins have been detected by looking for such large counts. If the response in step 110 is negative, the reading operation is ended without executing a decoding process. If the response in step 110 is affirmative, a query is made in step 120 to see if there is any missing data in the bar data stored in bar width memory 23 on the basis of the number of counts stored in bar width memory 23 between the counts corresponding to the margins detected in step 100. The respective counts detected as corresponding to the margins are used to determine that portion of the binary signal representing bar code 14.

The number the effective bar data stored in bar width memory 23 is expressed by $$U1 = MR = ML - 1 \tag{1}$$

where U1 is the number of the effective bar data (the number of stripes and spaces) having width counts stored in bar width memory 23. If the counts stored in bar width memory 23 are numbered in order as illustrated in FIG. 4 (corresponding to addresses in first memory 23), ML is the number of the count corresponding to the left margin and MR is the number of the count corresponding to the right margin.

The effective data stored in transition memory 25 is expressed by $$U2 = C(MR) = C(ML) = 1 \tag{2}$$

where U2 is the number of the effective bar data (the number of stripes and spaces) stored in transition memory 25. C(MR) is the number of the transition at the end of the right margin away from bar code 14 and C(ML) is the number of the transition at the end of the left margin adjacent to bar code 14. The number U1 of the effective bar data stored in bar width 23 and the number U2 of the effective bar data stored in transition memory 25 are compared to see if any bar data is lost.

Figure 3D:
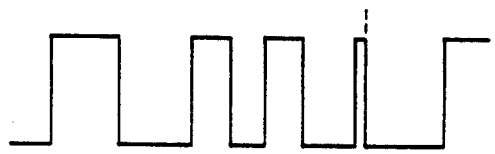

When bar code 14 has stripe A with a defect formed by misprinting on its one end as shown in FIG. 3A, first counter 22, similarly to the conventional counter, is unable to detect the level change X (FIG. 3C). Therefore, the data of a level L5 is lost and region B, the actual level of which is HIGH, is recognized as having a LOW level as shown in FIG. 3D.

However, since transition counter 24 need only update the number of the bar data stored in transition memory 25 every time the level of the binary signal changes, the number of bar data stored in transition memory 25 can be updated in a very short time. Thus transition counter 24 is able to detect the level change X (FIG. 3C) surely and to count the number of pulses corresponding to the data of level L5.

Thus, it is possible to decide correctly whether or not any bar data is lost due to misprinted stripes in the bar code through the comparison of the number U1 stored in bar width memory 23 and the number U2 stored in transition memory 25.

If the response in step 120 is affirmative, namely, when any bar data is lost, the reading operation is ended without executing a decoding process. If the response in step 120 is negative, namely, when no bar data is lost, the pulse counts stored in bar width memory 23 are read and subjected to a decoding process in step 130. In step 140, a query is made to see if the decoding process has been successfully completed. If the response in step 140 is negative, the reading operation is ended. If the response in step 140 is affirmative, the data obtained by the decoding process is stored temporarily in a RAM or the like in step 150 to hold the data until keyboard 8 (FIG. 1) is operated to send the data to an external unit.

Thus, bar code reader 15 in the first embodiment is provided with two series circuits connected in parallel. The first series circuit includes bar width counter 22 for counting the clock pulses been transitions of the binary signal provided by waveform shaping unit 20 and bar width memory 23 for storing the number of pulses counted by bar width counter 22. The second series circuit includes transition counter 24 for counting the number of transitions of the binary signal provided by waveform shaping unit 20 and transition memory 25 for storing the number of transitions counted by transition counter 24. Bar code reader 15 decides whether or not the count of the pulses stored in bar width memory 23 is correct through the comparison of the number of pulse counts stored in bar width memory 23 and the number of transitions stored in transition memory 25. Accordingly, the bar code reader 15 is able to detect surely the loss of part of the bar data due to the existence of a printing defect in bar code 14 to prevent the wrong recognition of bar code 14.

A bar code reader in a second embodiment according to the present invention will be described hereinafter with reference to FIG. 6.

Figure 6:
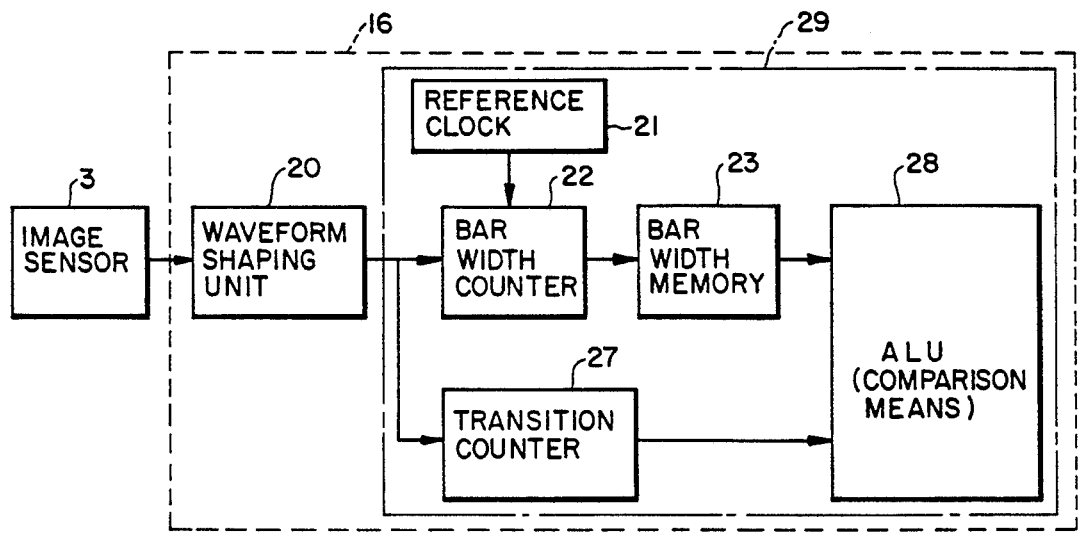
FIG. 6 is a block diagram of an ECU included in a bar code reader in another embodiment of the present invention.
Figure 9:
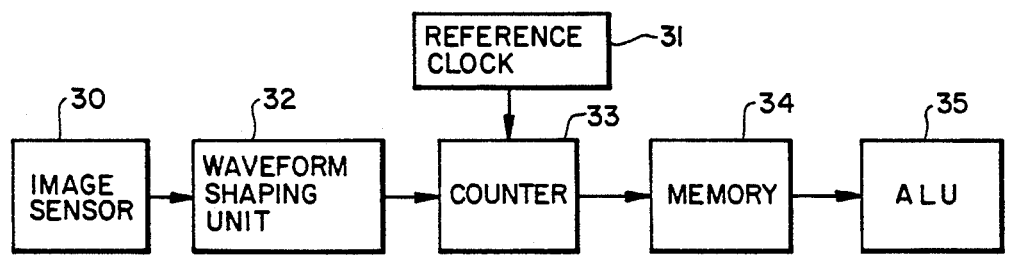
FIG. 9 is a block diagram of a conventional bar code reader.

As shown in FIG. 6, an ECU 16 employed in the bar code reader in the second embodiment is not provided with transition memory 25. The ECU 16 has a one-chip CPU 29 comprising a reference clock 21, a bar width counter 22, a bar width memory 23, a transition counter 27 and an ALU 28. If one-chip CPU 29 is an ordinary one-chip CPU, the capacity of the memory of one-chip CPU 29 is not large enough to store both the pulse counts representing the widths of the bar data and the number of bar data, and hence one-chip CPU 29 needs an external memory, which increases the cost of the bar code reader. To enable one-chip CPU 29 to function satisfactorily without requiring any external memory, the number of bar data of the binary signal detected by transition counter 27 is transferred directly to ALU 28. The number of bar data is incremented every time an input is given, whether the transition occurs in bar code 14, the adjacent margins or even beyond the margins in the area scanned by sensor 30. The number of bar data thus obtained is compared with the number of pulse counts corresponding to the same broad area including bar code 14 and beyond, as stored in bar width memory 23 to decide whether or not any bar data is lost.

However, since the bar code reader in the second embodiment uses the number of pulse counts stored bar width memory 23, the operation of the bar code reader is determined to be unsuccessful if, for example, a bar code error occurs in reading the images of areas outside the margins together with the bar code and the margins, and part of the data other than that of bar code 14 is lost. However, since the bar code reader will indicate that no error has occurred only when data including bar code 14 and any other data sensed by sensor 30 is correct, the bar code reader will not erroneously indicate that data is correct.

Figure 7:
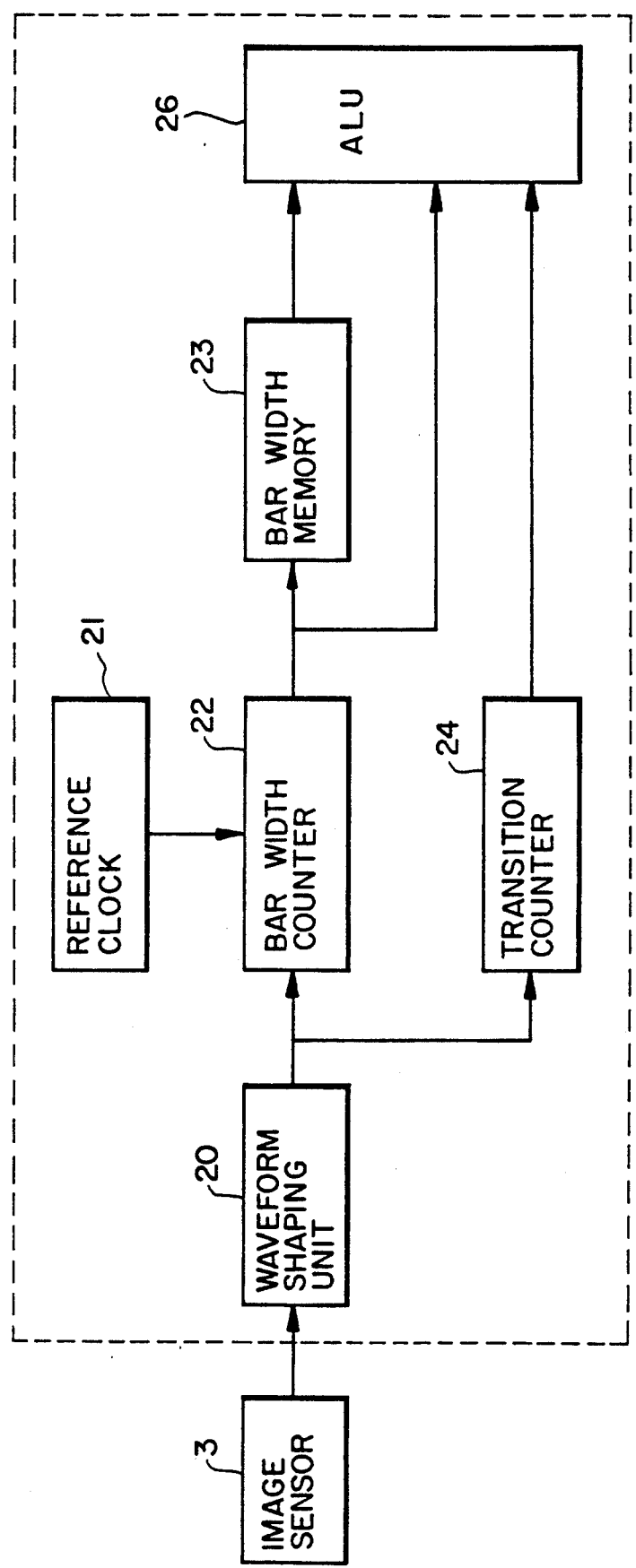
FIG. 7 is a schematic block diagram of an ECU (electrical control unit) constituting part of another embodiment of the invention.

As shown in FIG. 7, another embodiment of the invention involves detecting lost data by checking, not as a whole but individually, the data items detected by a bar width counter 22 and by a transition counter 24.

A waveform shaper 20 inputs signals individually to the bar width and the transition counters 22 and 24. The counters have a flag each that is turned on and off under instructions from an ALU 26 when the contents of the applicable counter change. Checking the on- and off-states of the counter-specific flags permits detection of data losses in individual data items.

How the ALU 26 of the embodiment of FIG. 7 works will now be described with reference to the flowchart of FIG. 8. In step 200, a check is made to see if the flag for the transition counter 24 is turned on in response to a signal input from the waveform shaper 20. Step 200 is repeated until the flag for transition counter 24 is found to be on. When the flag is on in step 200, step 210 is reached.

In step 210, that flag for the transition counter 24 which was turned on by the input signal is turned off. In step 220 following step 210, a check is made to see if the flag for the bar width counter 22 is turned on. If the flag is not on in step 220, step 250 is reached. In step 250, a data loss is recognized and the reading operation comes to an end.

If the flag for the bar width counter 22 is found to be on in step 220, step 230 is reached. In step 230, the bar width measured by the bar width counter 22 is stored in a first memory 23.

After storage of the bar width data into the bar width memory 23, step 240 is reached. In step 240, a check is made again to see if the flag for the transition counter 24 is turned on. Since the flag for the transition counter 24 was turned off in step 210, an on-state of the flag for the transition counter 24, if detected in step 240, indicates a bar data level change that occurred during storage of the bar width data counted by the bar width counter 22. If that is the case, step 240 is followed by step 250 in which the reading operation is terminated because of the lost data. Steps 200 through 250 correspond to the judging means of the second aspect of the invention.

If the flag for the transition counter 24 is not found to be on in step 240, step 260 is reached. In step 260, the flag for the bar width counter 22 is turned off. Step 260 is followed by step 200, and the process is repeated from there.

In the above-described embodiment the bar width and the transition counters 22 and 24 are judged for the loss of any one of individual data items. As soon as any data item is found to be lost, the reading operation is immediately brought to an end.

In bar code 14, the widths of the bar data vary in a direction parallel to the bar data in bar code 14. Bar code also exists, e.g., postal net bar code, in which the widths of the bar data vary in a direction perpendicular to the bar data in the bar code. The present invention is effective in detecting errors in reading this and any other types of bar codes.

What is claimed is:

1. A bar code reader for reading a bar code containing a plurality of bar data, comprising:
   means for converting an image of said bar code into an information signal;
   first means for detecting the respective widths of said bar data on the basis of said information signal provided by said converting means;
   second means for detecting a number of said bar data on the basis of said information signal provided by said converting means;
   means for recognizing information represented by said bar code from the respective widths of said bar data; and
   means for comparing a number of widths of said bar data detected by said first detecting means and a number of said bar data detected by said second detecting means and for inhibiting said recognizing means when said number of widths of said bar data is smaller than said number of said bar data.

2. A bar code reader according to claim 1, wherein said first detecting means comprising:
   first means for measuring the respective widths of said bar data on the basis of said information signal;
   first means for sequentially storing the respective widths of said bar data measured by said first measuring means in different storage areas, whenever the level of said information signal changes; and
   said comparing means compares said number of widths of said bar data stored in said first storing means and said number of said bar data detected by said second detecting means, and inhibits said recognizing means when said number of widths of said bar data is smaller than the number of said bar data.

3. A bar code reader according to claim 2, wherein said second detecting means comprises:
   second means for determining changes in the level of said information signal and for providing a storage signal whenever the level of said information changes, and
   second means for sequentially storing said storage signals provided by said second determining means in different storage areas, whenever said storage signal is received; and
   said comparing means compares said number of widths of said bar data stored in said first storing means and said number of said bar data stored in said second storing means and inhibits said recognizing means when said number of widths of said bar data read from said first storing means is smaller than said number of said bar data read from said second storing means.

4. A bar code reader for reading a bar code containing a plurality of bar data, comprising:
   first means for detecting the respective widths of said bar data;
   second means for detecting the number of said bar data; and
   means for comparing a number of said widths of said bar data detected by said first detecting means and a number of bar data detected by said second detecting means and for deciding a bar code reading operation is incorrect when said number of widths of said bar data is smaller than said number of said bar data.

5. A bar code reader for reading a bar code containing a plurality of bar data, comprising:
   first means for detecting the width of each of said bar data;
   second means for detecting the end of each of said bar data; and
   means for determining that an error has occurred in reading said bar code whenever said first means does not generate said width of one of said bar data when said second means detects the end of said bar data.

6. A method of detecting when an error has occurred in reading a bar code containing a plurality of bar data, comprising the steps of:
   detecting the width of each of said bar data;
   determining the number of widths detected in said detecting step;
   detecting the number of said bar data; and
   comparing said number of widths with said number of said bar data, to determine when said bar code has been misread.

7. A bar code reader for reading a bar code containing a plurality of bar data, comprising:
   first detection means for detecting individual bar width of said bar data;
   second detection means for detecting a bar data level change; and
   judging means for judging the reading operation to be erroneous if said first detection means fails to detect any of said bar widths from the time a bar data level change is detected by said second detection means until the next bar data level change is detected by said second detection means.

8. A method for detecting a reading operation error in reading a bar code containing a plurality of bar data, comprising the steps of:
   detecting individual bar widths of said bar data;
   detecting a bar data level change; and
   judging the reading operation to be erroneous if any of said bar width are not detected from the time a bar data level change is detected until the next bar data level change is detected.

9. A bar code reader for reading a bar code containing a plurality of bar data, comprising:
   means for converting an image of said bar code into an information signal;

first means for detecting the respective widths of said bar data on the basis of said information signal provided by said converting means;

second means, responsive to said information signal, for detecting the existence of bar data; and means for comparing data from said first means with data from said second means to determine when an error has occurred in reading said bar code.

10. A method of detecting when an error has occurred in reading a bar code containing a plurality of bar data, comprising the steps of:

detecting the width of each of said bar data;

independently detecting the presence of said bar data; and comprising the results of said detecting steps to determine when said bar code has been misread.

* * * * *